(12) United States Patent
Oomen et al.

(10) Patent No.: US 7,136,346 B1
(45) Date of Patent: Nov. 14, 2006

(54) RECORD CARRIER METHOD AND APPARATUS HAVING SEPARATE FORMATS FOR A STEREO SIGNAL AND A DATA SIGNAL

(75) Inventors: Arnoldus Werner Johannes Oomen, Eindhoven (NL); Leon Maria Van De Kerkhof, Eindhoven (NL)

(73) Assignee: Koninklijke Philips Electronic, N.V., Eindhoven (NL)

( * ) Notice: Subject to any disclaimer, the term of this patent is extended or adjusted under 35 U.S.C. 154(b) by 74 days.

(21) Appl. No.: 09/787,339

(22) PCT Filed: Jul. 11, 2000

(86) PCT No.: PCT/EP00/06588
§ 371 (c)(1),
(2), (4) Date: Mar. 16, 2001

(87) PCT Pub. No.: WO01/06509
PCT Pub. Date: Jan. 25, 2001

(30) Foreign Application Priority Data
Jul. 20, 1999 (EP) .................................. 99202383

(51) Int. Cl.
*G11B 7/00* (2006.01)
(52) U.S. Cl. ............................... 369/275.3; 369/59.27; 381/2; 381/23
(58) Field of Classification Search ............. 369/59.27, 369/275.1, 276, 275.3, 275.4, 47.16; 381/10, 381/23, 19, 2
See application file for complete search history.

(56) References Cited

U.S. PATENT DOCUMENTS

| | | | | |
|---|---|---|---|---|
| 4,583,132 A | * | 4/1986 | Nakano et al. | 360/19.1 |
| 4,672,600 A | * | 6/1987 | Balston et al. | 369/275 |
| 5,210,738 A | | 5/1993 | Iwata et al. | 369/275.1 |
| 5,506,907 A | * | 4/1996 | Ueno et al. | 381/18 |
| 5,590,204 A | * | 12/1996 | Lee | 381/24 |
| 5,724,327 A | | 3/1998 | Timmermans et al. | 369/48 |
| 5,812,971 A | * | 9/1998 | Herre | 704/230 |
| 5,832,424 A | * | 11/1998 | Tsutsui | 704/206 |
| 5,850,454 A | * | 12/1998 | Hawks | 381/27 |
| 5,889,868 A | * | 3/1999 | Moskowitz et al. | 380/51 |
| 5,912,976 A | * | 6/1999 | Klayman et al. | 381/18 |
| 6,236,731 B1 | * | 5/2001 | Brennan et al. | 381/316 |
| 6,314,289 B1 | * | 11/2001 | Eberlein et al. | 455/427 |
| 6,345,246 B1 | * | 2/2002 | Moriya et al. | 704/219 |
| 6,574,423 B1 | * | 6/2003 | Oshima et al. | 386/111 |
| 6,850,622 B1 | * | 2/2005 | Maejima | 381/22 |

FOREIGN PATENT DOCUMENTS

EP       0372601 A1     6/1990

\* cited by examiner

*Primary Examiner*—Gautam R. Patel

(57) ABSTRACT

A record carrier carries a stereo signal and a data signal which includes a first data portion and a remaining data portion. A first channel on the record carrier includes a composite signal which is obtained by combining the stereo signal and the first data portion. A second channel on the record carrier includes the remaining data portion of the data signal. The stereo signal and the data signal are recorded to and reproduced from the record carrier using a recording apparatus and a reproducing apparatus.

11 Claims, 2 Drawing Sheets

Figure 1:
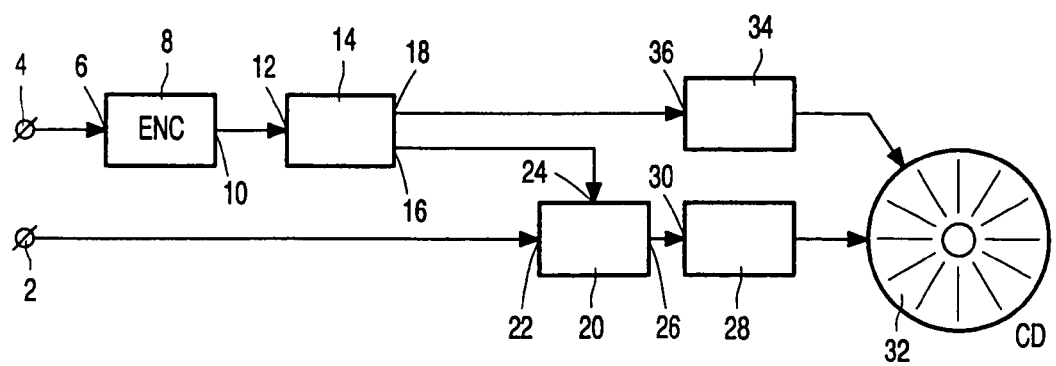

RECORD CARRIER METHOD AND APPARATUS HAVING SEPARATE FORMATS FOR A STEREO SIGNAL AND A DATA SIGNAL

The invention relates to a record carrier carrying a stereo signal and a data signal, said stereo signal being recorded in a first channel on the record carrier.

The invention further relates to a method of recording the stereo signal and the data signal on said record carrier, to a recording apparatus carrying out the method and to a reproducing apparatus for reproducing the stereo signal and the data signal.

A record carrier and apparatuses defined above are known from EP-A-0 372 601. The first channel on the known record carrier has a constant data capacity for carrying the stereo signal and the data signal. Said document describes a general method for burying the data signal in the stereo signal. Sometimes the data capacity of the first channel is not sufficient to carry both the stereo signal and the data signal without loosing too much signal quality.

It is an object of the invention to provide a record carrier able to carry a stereo signal and a data signal with increased data capacity for the stereo signal and the data signal.

The record carrier in accordance with the invention is characterized in that the data signal comprises a first portion and a remaining portion, said first portion being combined with said stereo signal to obtain a composite signal being recorded in said first channel on said record carrier and the remaining portion being recorded in a second channel on said record carrier.

In an embodiment of the record carrier, the record carrier is characterized in that said first channel is represented by first variations of a first physical parameter of the record carrier and said second channel is represented by second variations of a second physical parameter of the record carrier, said second physical parameter differing from said first physical parameter.

The invention is based on the recognition that realizing a second channel on a record carrier enables an increase of the data capacity for recording the stereo signal and the data signal on the record carrier. Such increased data capacity can be used to enable the recording of a data signal with an increased datarate. It might be possible to record a multichannel signal in addition to the stereo signal on the record carrier. For example by using the buried channel techniques a buried channel is generated in the stereo signal for accommodating the first portion of the data signal. In some cases the data capacity in the first channel is not sufficient to carry the entire data signal. Therefore the second channel is used for carrying a remaining portion of the data signal. It should be noted that a record carrier with such second channel is known from U.S. Pat. No. 5,210,738 and U.S. Pat. No. 5,724,327. However, said documents do not mention that the data capacity of the buried channel is not sufficient to carry the data signal. Neither do said documents give a solution to increase the data capacity on the record carrier needed for carrying the data signal.

Figure 2:
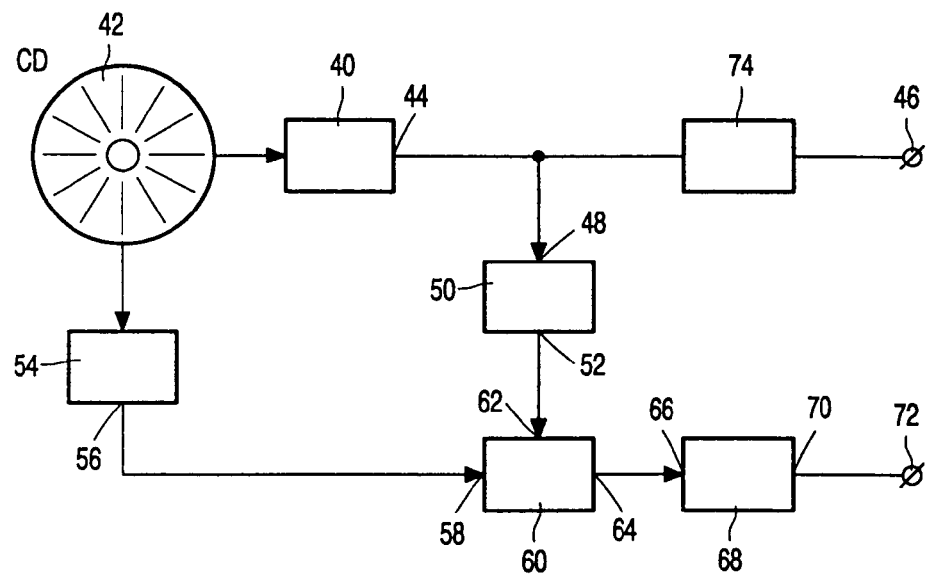
Figure 3:
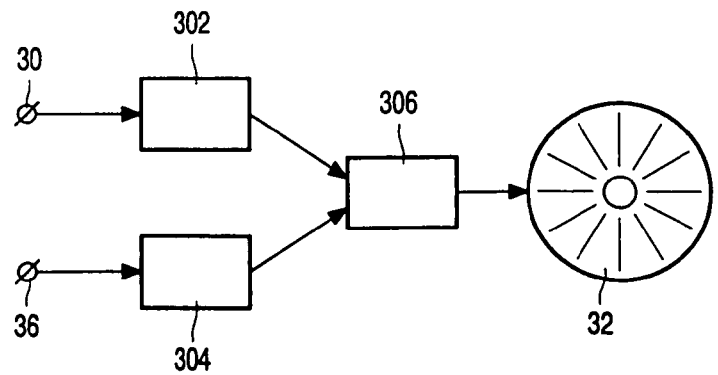
Figure 4:
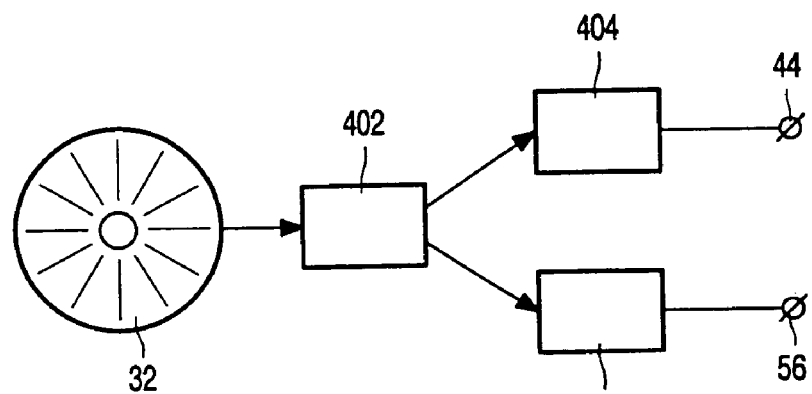
Figure 5:
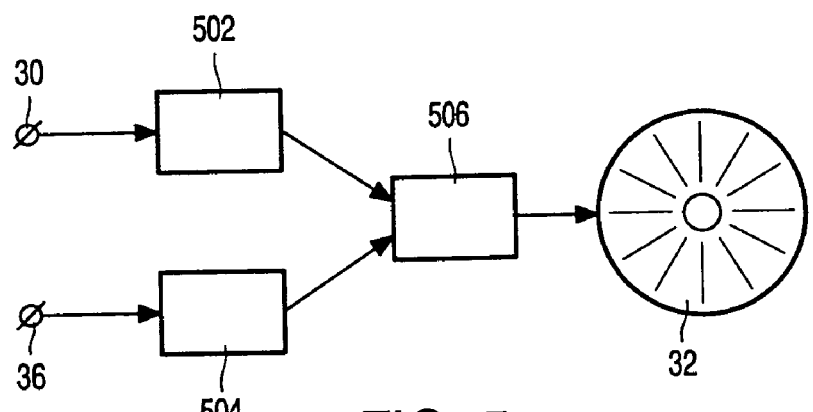
Figure 6:
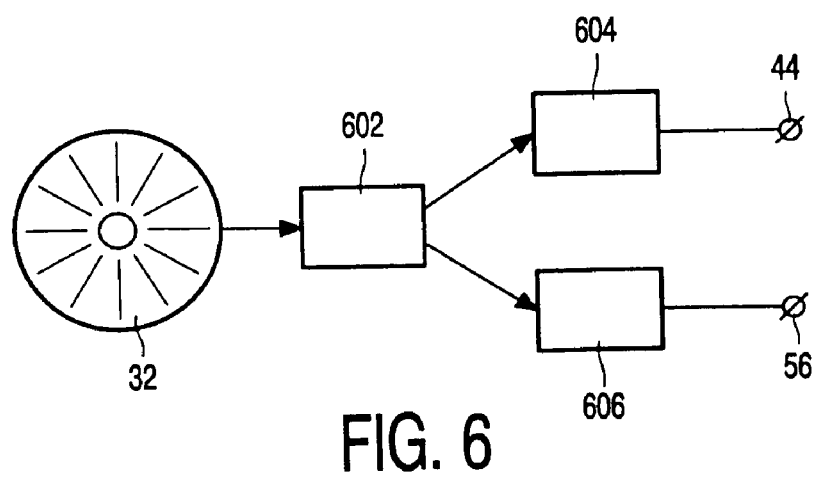

These and other aspects of the invention will be apparent from and elucidated with respect to the embodiments described hereafter in the figure description in which FIG. 1 shows an embodiment of a recording apparatus, FIG. 2 shows an embodiment of a reproducing apparatus, FIG. 3 shows another embodiment of the first and second writing means in the recording apparatus of FIG. 1, FIG. 4 shows another embodiment of the first and second reading means in the reproducing apparatus of FIG. 2, FIG. 5 shows a second embodiment of the first and second writing means in the recording apparatus of FIG. 1, FIG. 6 shows a second embodiment of the first and second writing means in the reproducing apparatus of FIG. 2.

FIG. 1 shows a first embodiment of the recording apparatus in accordance with the invention. The recording apparatus is adapted for recording a stereo signal and a data signal, said data signal being a multichannel extension signal. The multichannel extension signal comprises at least one signal such as a center signal, a monophonic surround signal, a surround left signal, a surround right signal or a quadrophonic signal. The apparatus comprises first input terminal 2 for receiving a stereo signal and second input terminal 4 for receiving a multichannel extension signal. The stereo signal and the multichannel extension signal are preferably sampled at a frequency of 44.1 kHz. The second input terminal is coupled to an input 6 of a data-compressing unit 8. The data-compressing unit is adapted to compress the multichannel extension signal and to supply a data compressed multichannel extension signal to an output 10. The specific type of data compressing carried out in the data-compressing unit is not essential for the invention. The output 10 of the data-compressing unit 8 is coupled to input 12 of a splitting unit 14. The splitting unit 14 is adapted to split the received compressed multichannel extension signal into a first portion for supplying to a first output 16 and a remaining portion for supplying to a second output 18. The apparatus further comprises a combining unit 20 with a first input 22 coupled to the first input terminal 2, a second input 24 coupled to the first output 16 of the splitting unit 14 and an output 26. The combining unit is arranged for combining the received stereo signal and the first portion of the compressed multichannel extension signal, preferably by using buried data techniques. Buried data techniques are well known in the art. These techniques make it possibly to bury a data channel in the stereo signal. When the stereo signal, for example, contains a left and right channel each consisting of 16 bits/sample, a data channel with an average capacity of 5 bits/sample can be obtained without decreasing the perceptual audio quality of the 16 bits/sample of the left and right signal. Another suitable method is disclosed in EP-A-0 372 601. Said document discloses the so-called hidden channel method for burying additional information in a digital audio signal.

The apparatus is provided with first writing unit 28. Input 30 of the first writing unit is coupled to the output 26 of the combining unit 20. The first writing unit is adapted to write the received combination of the stereo signal and the first portion of the data compressed multichannel signal in a first channel of a record carrier 32. The record carrier is preferably a standard audio CD and the written stereo signal in the first channel can be reproduced by a conventional CD player. The first channel is in that case formed by optical detectable marks in a track, whereby the optically detectable marks are in the form of so-called pits.

The apparatus is further provided with second writing unit 34. Input 36 of the writing unit 34 is coupled to the second output 18 of the splitting unit 14. The second writing unit is adapted to write the remaining portion received at the input 36 in a second channel of the record carrier 32. The second channel is preferably written by variations of the track. In U.S. Pat. No. 5,724,327 some embodiments of the second channel are disclosed.

The functioning of the apparatus will now be described in greater detail. The second input terminal 4 receives the multichannel extension signal. The multichannel extension signal comprises for example a left signal, a right signal, a center signal, a surround left signal and a surround right signal and has a sample frequency of 44.1 kHz. Next the multichannel extension signal is data compressed by the data-compressing unit 8. The compressing unit preferably comprises a perceptual encoder, such as an MPEG-2 audio encoder, for compressing the multichannel extension signal to obtain the data compressed multichannel extension signal. A data compressed multichannel extension signal in the form of a MPEG stream generated by a normal MPEG 2 audio encoder requires for a good signal quality a bit-rate of 384 Kbits/sec. More complex MPEG encoders can provide a MPEG stream comprising high quality signals at 320 Kbits/s.

The stereo signal received at the first input terminal 2 is supplied to a combination unit 20. The stereo signal comprises a left signal and a right signal and a sample frequency of 44.1 kHz. The left signal in the stereo signal can be any combination of a left signal, a center signal and a surround left signal or mono surround signal and the right signal in the stereo signal can be any combination of a right signal, a center signal and a surround right signal or mono surround signal. In the combination unit 20 the stereo signal is analyzed with for example buried data techniques to determine bits in the signal that can be used for a buried data channel without decreasing the perceptual quality of the stereo signal. For a standard audio CD the left signal as well as the right signal has 16 bits/sample. By using buried data techniques, burying a data signal in the stereo signal to be stored on the record carrier, typically, an additional capacity of about 30% of the CD capacity becomes available for any data signal. On average this data capacity is 5 bits/sample. The minimum data capacity is 2 bits/sample and is obtained for very low level signals. Thus the data capacity of the buried channel is on average 2×5×44.1 kHz=441 kbits/s and minimal 176.4 kbits per second. The minimum data capacity by using buried data techniques (=176.4 kbits/s) is thus not enough to carry a data compressed multichannel extension signal in the form of a MPEG stream with a good signal quality (=384 kbits/s).

As mentioned before a second channel on the record carrier is available. U.S. Pat. No. 5,724,327 discloses some embodiments of a second channel. If an audio sample comprises 16 bits, a data capacity near to 2-bits/audio sample can be obtained by variations in the width of optical detectable marks. Thus for a standard audio CD this means a capacity of 2×2×44.1 kHz=176.4 kbits/s. Together with the capacity of the buried channel in the first channel the record carrier can carry at least a signal with a bitrate of 352.8 kbits/s and on average a bitrate of 617.4 kbits/s. This total capacity is sufficient to carry most MPEG streams with a good quality generated by a MPEG 2 audio encoder.

To distribute the data compressed multichannel extension signal over the buried data channel in the stereo signal and the second channel, the data compressed multichannel extension signal is split by the splitting unit 14 in a first portion and a remaining portion. The splitting is preferably done by demultiplexing of the data compressed multichannel extension signal. The multiplexing could be done by repetitively applying five bytes of the data compressed multichannel extension signal to the first portion and applying two bytes to the remaining portion. It is also possible to have an adaptive multiplexer, where the distribution is adaptively controlled. The first portion is supplied to the combining unit 24 and is combined by using for example the buried data techniques with the stereo signal to obtain a composite signal. The first writing unit writes the composite signal in the first channel on the record carrier. The first channel could be written on the record carrier by first variations of a first physical parameter of the record carrier, for example in the form of optical detectable marks which alternate with intermediate areas. The optically detectable marks may be in the form of so-called pits on a standard CD. The optically detectable marks are arranged along a track. The second writing unit writes the remaining portion in the second channel on the record carrier. The second channel could be written on the record carrier by second variations of a second physical parameter, for example in the form of variations of the optical detectable mark transverse to the track direction such as variation of the width of the marks.

An advantage of the recording apparatus in accordance with the invention is that it produces record carriers, for example CD's, that can be used in CD players in accordance with the current CD standard to reproduce the stereo signal. Said CD players can only read the first channel and thus the composite signal. The composite signal is in the form of a stereo signal. By using the buried data techniques the perceptual quality level of the stereo signal in the composite signal is not decreased. As a result of which a customer will hear almost the same signal quality as the quality of the stereo signal that does not have a buried data channel.

Another advantage of the record carrier in accordance with the invention is that the whole content on the record carrier can not be copied with normal CD recorders on the market today. Those CD recorders are able to read the first channel and not able to read the second channel. A copy made by said CD recorders will only contain the composite signal and thus only the first portion of the multichannel extension signal. As a result, the multichannel data signal cannot be reproduced from said copy, thus providing a copy-protection means.

FIG. 2 shows a first embodiment of the reproducing apparatus for reproducing a stereo signal and a data signal from a record carrier in accordance with the invention. The data signal in this embodiment is a multichannel extension signal. The apparatus comprises a first reading unit 40 for reading a composite signal written in a first channel on a record carrier 42 and supplying the composite signal to an output 44. This first channel is preferably in the form of a channel that carries the 16 bit/sample stereo signal on a standard CD. The output 44 of the first reading unit 40 is coupled via a converting unit 74 to a first output terminal 46 of the apparatus. The converting unit converts the composite signal into the stereo signal. The first output terminal 46 could be coupled to, for example a power amplifier, an equalizer or speakers.

The output 44 of the first reading unit 40 is further coupled to an input 48 of the extracting unit 50. The extracting unit 50 is adapted to extract a first portion of a data compressed multichannel extension signal from the composite signal received at the input 48, and to supply the first portion to an output 52.

The apparatus further comprises a second reading unit 54 for reading a remaining portion of the data compressed multichannel signal written in a second channel on the record carrier 42 and supplying the remaining portion to an output 56. The second channel is preferably in the form of second variation of a second physical parameter of the record carrier whereby the second variation of the second physical parameter differs from a first variation of a first physical parameter used for carrying the first channel on the record carrier. U.S. Pat. No. 5,724,327 discloses some possible embodiments of the second channel. Said document discloses variation of the position of a track on the record carrier, variation of the width or depth of pits in the track or variations of the frequency of the recovered data clock. The second reading unit is adapted to detect said second physical parameter, and to supply the remaining portion in response to said detected second physical parameter. The output 56 of the second reading unit 54 is coupled to a first input 58 of a combination unit 60. The output 52 of the extraction unit 50 is coupled to a second input 62 of the combination unit 60. The combination unit 60 is adapted to combine the first portion of the data compressed multichannel extension signal and the remaining portion of the data compressed multichannel extension signal received at the second and first input respectively, and to generate the multichannel extension signal for supplying to a output 64. The output 64 is coupled to an input 66 of decompressing unit 68.

The decompressing unit 68 is adapted to decompress the data compressed multichannel extension signal received at the input 66 into a multichannel extension signal. An output 70 of the decompressing unit is coupled to a second output terminal 72 of the apparatus. The second output terminal 72 could be coupled to a power amplifier, an equalizer or a speaker system.

The functioning of the reproducing apparatus will now be described in greater detail. The record carrier 42 carrying the stereo signal and the multichannel extension signal comprises a first channel carrying a composite signal comprising the stereo signal and a first portion of the multichannel extension signal, and a second channel carrying a remaining portion of the multichannel extension signal. The first channel is represented by first variations of a first physical parameter of the record carrier and the second channel is represented by second variations of a second physical parameter. The first channel is preferably as on a standard CD, carrying a stereo signal. The first reading unit 40 reads the composite signal from the first channel of the record carrier by detecting first variations of a first physical parameter of the record carrier. The composite signal comprises the stereo signal and the first portion of a data compressed multichannel signal. Thus the composite signal can be supplied directly to the first output terminal for reproduction of the stereo signal. In that case the conversion unit 74 is unnecessary. The extraction unit 50 is arranged for extracting the first data compressed multichannel extension signal from the composite signal.

The second reading unit 54 reads the remaining portion of the data compressed multichannel extension signal from the second channel by detecting second variations of a second physical parameter of the record carrier. If the variations of the second physical parameter have the form of variations of the width of the optical detectable marks, the variations in the width of the mark result in an additional intensity modulation in a radiation beam scanning the track. In a standard CD player only the intensity modulation due to the variations of the first physical parameter can be detected from the radiation beam. An arrangement for detecting the second channel in the form of variations of the track positions in a direction transverse to the track direction is described in U.S. Pat. No. 5,724,327. The combining unit 60 is adapted to combine the first portion of the data compressed multichannel extension signal and the remaining portion. The combining unit 60 performs preferably the multiplexing of the first portion and the remaining portion to obtain the data compressed multichannel extension signal. The data compressed multichannel extension signal can be an MPEG 2 audio stream generated by an MPEG-2 audio encoder. The multichannel extension signal comprises for example a left signal, a right signal, a center signal, a surround left signal and a surround right signal. The multichannel extension signal is applied to the second output terminal for reproduction by for example a speaker system.

FIG. 3 shows another embodiment of the first and second writing means in the recording apparatus of FIG. 1. A channel modulation unit 302 receives the composite signal supplied to its input and processes the composite signal to obtain a sequence of m-bit channel words. Preferably the channel modulation unit comprises an n-m channel modulator. A generator unit 304 receives the remaining portion supplied to its input and generates p merging bits in response to said remaining portion. An unit 306 receives the sequence of m-bit channel words and p merging bits and inserts the p merging bits between adjacent m-bit channel word to obtain a signal to be written on the record carrier 32. The p merging bits are normally used to prevent (d,k) constraint violations between adjacent channel words and for the additional task of DC control. A method for generating p merging bits carrying an additional signal and preventing for (d,k) constraints violations between adjacent channel words is described in the non pre-published patent application EP 99202061.0. The data capacity for the additional signal thus obtained, is used to carry the remaining portion. The first writing unit 28 in the apparatus of FIG. 1 comprises the units with reference number 302 and 306. The second writing unit 34 in the apparatus of FIG. 1 comprises the units with reference number 304 and 306.

FIG. 4 shows another embodiment of the first and second reading means in the reproducing apparatus of FIG. 2. A unit 402 reads a reproduction signal from the record carrier 32. The reproduction signal comprises a sequence of m-bit channel words with p merging bits between each time adjacent m-bit channel words. The unit 402 split said reproduction signal into a sequence of m-bit channel words and said p merging bits. The sequence of m-bit channel words is supplied to a channel demodulator unit 404 arranged for preferably m-n channel modulation to obtain the composite signal. The composite signal, which is in the form of a standard digital stereo signal, is supplied to output terminal 44. The p merging bits are supplied to a processing unit 406. The processing unit 406 is arranged for processing the p merging bits to obtain the remaining portion for supplying to output terminal 56. The first reading unit 40 in the apparatus of FIG. 2 comprises the units with reference number 402 and 404. The second reading unit 54 in the apparatus of FIG. 2 comprises the units with reference number 402 and 406.

FIG. 5 shows a second embodiment of the first and second writing means in the recording apparatus of FIG. 1. A processing unit 502 receives the composite signal supplied to its input and processes the composite signal to obtain a sequence of q byte blocks. The processing unit can comprise a cross-interleaved Reed-Solomon encoder. The value of q is 32 for the standard CD format. A subcode encoder 504 receives the remaining portion supplied to its input and generates an r byte subcode in response to said remaining portion. The subcode in the standard CD format is essentially an auxiliary data stream. At least one bit of said r byte subcode such as the U-subcode is obtained in response to the remaining portion. A unit 506 receives the sequence of q byte blocks and said r byte subcode and inserts the r byte subcode between adjacent m-bit channel word to obtain a signal to be written on the record carrier 32. Preferably prior to writing said signal on the record carrier, the signal is channel encoded by for example an EFM encoder. The first writing unit 28 in the apparatus of FIG. 1 comprises the units with reference number 502 and 506. The second writing unit 34 in the apparatus of FIG. 1 comprises the units with reference number 504 and 506.

FIG. 6 shows a second embodiment of the first and second reading means in the reproducing apparatus of FIG. 2. A unit 602 reads a reproduction signal from the record carrier 32. The reproduction signal comprises a sequence of q byte blocks with r byte subcodes between each time adjacent q byte blocks. The unit 602 split said reproduction signal into a sequence of q byte blocks and said r byte subcodes. The splitting is based upon the physical position of q byte blocks and the subcodes in the reproduced signal. The sequence of q byte blocks is supplied to a processing unit 604 arranged for processing the sequence of q byte blocks to obtain the composite signal. The processing unit may perform the operations Reed-Solomon decoding and de-cross-interleaving. The composite signal, which is in the form of a standard digital stereo signal, is supplied to output terminal 44. The r byte subcodes are supplied to a processing unit 606. The processing unit 606 is arranged for processing the r byte subcodes to obtain the remaining portion from at least one bit of the r byte subcodes. The remaining portion is supplied to output terminal 56. The first reading unit 40 in the apparatus of FIG. 2 comprises the units with reference number 602 and 604. The second reading unit 54 in the apparatus of FIG. 2 comprises the units with reference number 602 and 606.

Whilst the invention is described with reference to preferred embodiments thereof, it is to be understood that these are not limiting examples. Thus various modifications may become apparent to those skilled in the art, without departing from the scope of the invention, as defined by the claims. As an example, the multichannel extension signal comprising the left signal, right signal, center signal, surround left signal and surround right signal could be an extension signal comprising pictures, video or computer data. Further, in an alternative embodiment the splitting unit could be arranged to scramble the data compressed multichannel extension signal into a scrambled signal and to generate a first portion comprising the scrambled signal and a remaining portion comprising a scrambling key. In another embodiment of the record carrier the first portion comprises the center signal and the remaining portion comprises the surround left signal and surround right signal. Other channel modulators as the mention n to m modulator may be used.

The word 'comprising' does not exclude the presence of other elements or steps than those listed in a claim. Any reference signs do not limit the scope of the claims. The invention can be implemented by means of both hardware and software. Several means may be represented by the same item of hardware. Further the invention lies in each and every novel feature or combination of features.

The invention claimed is:

1. A record carrier carrying a stereo signal and a data signal, said stereo signal being recorded in a first channel using a first physical feature on said record carrier, characterized in that the data signal comprises a first portion and a remaining portion, said first portion being combined with said stereo signal to obtain a composite signal being recorded using said first physical feature on said record carrier and the remaining portion being recorded in a second channel using a second physical feature on said record carrier different from said first physical feature, wherein said composite signal in said first channel and said remaining portion in said second channel being obtained by n to m channel modulation of the composite signal into a sequence of m-bit channel words, insertion of p merging bits between said m-bit channel words, said merging bits being modified in response to said remaining portion.

2. The record carrier as claimed in claim 1, characterized in that said first portion being combined with said stereo signal by using buried data techniques.

3. The record carrier as claimed in claim 1, characterized in that the data signal comprises a data compressed multichannel extension signal being a representation of a multichannel extension signal.

4. The record carrier as claimed in claim 3, characterized in that the multichannel extension signal comprises a center channel signal.

5. The record carrier as claimed in claim 4, characterized in that the multichannel extension signal comprises a surround left signal and a surround right signal.

6. The record carrier as claimed in claim 3, characterized in that the data compressed multichannel extension signal is a perceptually encoded representation of the multichannel extension signal.

7. The record carrier as claimed in claim 3, characterized in that the first portion represents a partial representation of the multichannel extension signal.

8. The record carrier as claimed in claim 1 characterized in that said first physical feature is represented by first variations of a first physical parameter of the record carrier and said second physical feature is represented by second variations of a second physical parameter of the record carrier, said second physical parameter differing from said first physical parameter.

9. The record carrier as claimed in claim 1 characterized in that said first physical feature further comprises a first optically detectable indicia within the record carrier and said second physical feature further comprises a second optically detectable indicia different from said first optically detectable indicia.

10. A record carrier carrying a stereo signal and a data signal, said stereo signal being recorded in a first channel using a first physical feature on said record carrier, wherein the data signal comprises a first portion and a remaining portion, said first portion being combined with said stereo signal to obtain a composite signal being recorded using said first physical feature on said record carrier and the remaining portion being recorded in a second channel using a second physical feature on said record carrier different from said first physical feature, and wherein said composite signal in said first channel and said remaining portion in said second channel being obtained by processing the composite signal into a sequence of q byte blocks, insertion of a r byte subcode between said q byte blocks, at least one bit of said r byte subcode being obtained in response to said remaining portion.

11. The record carrier as claimed in claim 10, characterized in that said composite signal in said first channel and said remaining portion in said second channel being obtained by further channel encoding of the sequence of q byte blocks and r byte subcodes.

* * * * *